(12) United States Patent
Inoue et al.

(10) Patent No.: US 7,591,134 B2
(45) Date of Patent: Sep. 22, 2009

(54) VACUUM BOOSTER OF BRAKE DEVICE

(75) Inventors: Yoji Inoue, Toyoake (JP); Yoshiyuki Yasui, Kariya (JP)

(73) Assignee: Advics Co., Ltd., Kariya, Aichi-Pref (JP)

( * ) Notice: Subject to any disclaimer, the term of this patent is extended or adjusted under 35 U.S.C. 154(b) by 307 days.

(21) Appl. No.: 11/798,768

(22) Filed: May 16, 2007

(65) Prior Publication Data
US 2007/0266850 A1 Nov. 22, 2007

(30) Foreign Application Priority Data
May 22, 2006 (JP) .............................. 2006-141420

(51) Int. Cl.
*B60T 13/56* (2006.01)
*F15B 9/10* (2006.01)
(52) U.S. Cl. ........................ 60/552; 91/369.3
(58) Field of Classification Search .................. 60/552, 60/554, 588; 91/369.2, 369.3, 376 R
See application file for complete search history.

(56) References Cited

U.S. PATENT DOCUMENTS

| | | | | |
|---|---|---|---|---|
| 4,283,911 A | * | 8/1981 | Nakamura et al. | ......... 91/369.2 |
| 4,416,188 A | * | 11/1983 | Katagiri et al. | ............ 91/369.3 |
| 5,442,917 A | * | 8/1995 | Gautier et al. | ............. 91/369.2 |
| 6,244,049 B1 | * | 6/2001 | Oka et al. | ................. 91/376 R |
| 6,550,367 B2 | * | 4/2003 | Petin et al. | ................. 91/369.3 |
| 6,742,437 B2 | | 6/2004 | Yamashita | |

FOREIGN PATENT DOCUMENTS

JP 2003-127851 A 5/2003

* cited by examiner

*Primary Examiner*—Thomas E Lazo
(74) *Attorney, Agent, or Firm*—Buchanan Ingersoll & Rooney PC

(57) ABSTRACT

The present invention provides a vacuum booster, which is constructed such that an area with which a cylinder communicates with a port communicating with a reservoir and being open to the cylinder is reduced at high temperature, so that a sufficient reaction force can be transmitted from a piston of a master cylinder to a valve mechanism at an initial stage of the braking operation, thus preventing vibration or noise from being generated in the valve mechanism. At high temperature, stop position, at which backward movement of the piston of the master cylinder is limited by an output member while a valve piston is at a non-operating position, is shifted forwards by a stop position shifting means, thus reducing the area with which the cylinder communicates with the port communicating with the reservoir and being open to the cylinder. At low temperature, while the valve piston is at the non-operating position, the stop position of the piston is not shifted, thus maintaining the area wide, with which the port communicates with the cylinder.

7 Claims, 7 Drawing Sheets

VACUUM BOOSTER OF BRAKE DEVICE

INCORPORATION BY REFERENCE

This application is based on and claims priority under 35 U.S.C. sctn. 119 with respect to Japanese Application No. 2006-141420 filed on May 22, 2006, the entire content of which is incorporated herein by reference.

BACKGROUND OF THE INVENTION

1. Field of the Invention

The present invention relates generally to vacuum boosters for vehicles. More particularly, the present invention relates to a vacuum booster of brake device, which is adapted for a brake device including an liquid pressure generating unit pumping and supplying brake liquid stored in a reservoir to a wheel cylinder by using a pump through a port that is open to a cylinder of a master cylinder.

2. Discussion of the Related Art

As well known to those skilled in the art, a typical vacuum booster includes a partition member, which is installed in a booster shell so as to be movable forwards and backwards to partition a pressure chamber into a variable pressure chamber and a negative pressure chamber, a valve piston coupled to the partition member, an output member provided in the valve piston so as to be movable forwards and backwards so that a piston of a master cylinder is pushed and moved by forward movement of the valve piston, a reaction applying means for transmitting part of reaction force that is transmitted from the piston to the output member to an input member, and a valve mechanism installed in the valve piston to switch an liquid passage.

The valve mechanism includes a ring-shaped negative pressure valve seat provided in the valve piston, a plunger slidably fitted in the valve piston, a ring-shaped atmospheric valve seat provided in the plunger, a valve body closely contacted with the negative pressure valve seat and the atmospheric valve seat, a negative pressure passage communicating with a space defined outside a negative pressure valve where the negative pressure valve seat contacts with the valve body, an atmosphere passage communicating with a space defined inside an atmospheric valve where the atmospheric valve seat contacts with the valve body, and a variable pressure passage communicating with a space defined between the negative pressure valve and the atmospheric valve.

When the vacuum booster having the above-mentioned construction is not in operation, the valve body comes into contact with the atmospheric valve seat of the plunger and thus closes the atmospheric valve, thereby isolating the atmosphere passage from the variable pressure passage, and is separated from the negative valve seat to open the negative pressure valve, thus causing the negative pressure passage to communicate with the variable pressure passage. In this state, because the negative pressure chamber and the variable pressure chamber, which are formed on opposite sides of the partition member in the vacuum booster, communicate with each other through the negative pressure passage and the variable pressure passage, no pressure difference is applied to the partition member, thus the valve piston and the plunger are maintained at non-operating positions.

When the vacuum booster is in operation, the valve body is moved away from the atmospheric valve seat of the plunger to open the atmospheric valve, thus causing the atmosphere passage to communicate with the variable pressure passage, and is brought into contact with the negative pressure valve seat to close the negative pressure valve, thus isolating the negative pressure passage from the variable pressure passage. In this state, because the variable pressure chamber, which is defined behind the partition member in the vacuum booster, communicates with the atmosphere through the variable pressure passage and the atmosphere passage, a pressure difference is applied to the partition member, therefore the partition member is moved forwards.

Here, in the conventional vacuum booster, the valve mechanism operates such that the input from a brake pedal is balanced with part of the reaction force from the piston of the master cylinder by the operation of the reaction applying means, thus boosting the input. However, the conventional vacuum booster is problematic in that, at the initial stage of the braking operation, as the reaction force is small, and the servo balance of the valve mechanism, in which the negative pressure valve and the atmospheric valve are closed together, is unstable, vibration or noise is generated. In other words, when the reaction force from the piston is small, the force applied in the direction in which the atmospheric valve is closed is small, and therefore the atmospheric valve is not reliably closed, so that outside air is drawn too much into the variable pressure chamber. Thus, subsequently, during a process of balancing the valve mechanism by using the reaction force from the piston and the input from the brake pedal, the negative pressure valve is in open state though the atmospheric valve is closed because the reaction force is increased relative to the input. It results in generating vibration.

Recently, for example, to increase the driving stability of a vehicle, a brake device including an liquid pressure generating unit has been used, which is constructed such that, when the master cylinder is in a non-operating state, brake liquid is pumped and supplied by a pump to a wheel cylinder through a port that communicates with a reservoir and is opened to the cylinder. The brake device usually has a structure such that, when the master cylinder is in a non-operating state, the area, with which the port communicates with the cylinder, is extended so that brake liquid is more rapidly supplied from the reservoir to the wheel cylinder. However, in such a construction, because liquid pressure is not applied to the wheel cylinder until the port is isolated from the master cylinder by the piston that is pushed and moved forwards by the output member of the vacuum booster when the master cylinder is operated, reaction force from the piston is reduced at the initial stage of the braking operation, with the result that the valve mechanism easily vibrates.

In an effort to overcome the above problem, in a vacuum booster disclosed in Japanese Laid-Open Patent Publication No. 2003-127851 (for example, in pages 2 and 3 and FIGS. 1 and 2 thereof), an atmospheric valve, which allows a variable pressure chamber to communicate with the atmosphere or isolates it therefrom, comprises a first atmospheric valve and a second atmospheric valve, and an orifice passage communicating with the atmosphere defined between the first atmospheric valve and the second atmospheric valve. In this construction, when the vacuum booster is in a non-operating state, the first atmospheric valve and the second atmospheric valve are both closed, so that the variable pressure chamber is isolated from the atmosphere. When the operation of the vacuum booster begins, the first atmospheric valve is opened while the second atmospheric valve remains closed, and thus outside air is drawn into the variable pressure chamber through the orifice passage. Thereafter, the second atmospheric valve is opened, so that outside air is drawn into the variable pressure chamber through both the orifice passage and the second atmospheric valve.

Here, because the flow of outside air is limited by the orifice passage, the amount of outside air drawn into the variable pressure chamber is reduced compared to that of the vacuum booster of the related art. Therefore, at the initial stage of the braking operation, the amount of output relative to the amount of input becomes appropriate, thus it can prevent vibration and noise in the valve mechanism. Furthermore, when a second seat portion of a valve body constituting the second atmospheric valve is separated from the first atmospheric valve of a plunger, outside air can be rapidly drawn into the variable pressure chamber, both through the second atmospheric valve and through the first atmospheric valve, which is opened sooner than the second atmospheric valve. Therefore, a braking operation is equal to that of the vacuum booster of the related art can be conducted.

In the vacuum booster of Japanese Laid-Open Patent Publication No. 2003-127851, air passing through the atmospheric valve at the initial stage of the braking operation is restricted by the orifice passage such that outside air is restricted to be drawn into the variable pressure chamber. However, because the flow rate of air is restricted by contraction, it is necessary to greatly increase contraction resistance to prevent vibration and noise in the valve mechanism. As a result, at the initial stage of the braking operation of the vacuum booster, operational responsiveness is deteriorated.

SUMMARY OF THE INVENTION

Accordingly, it is a primary object of the present invention to provide a vacuum booster of brake device, which is constructed such that, when the temperature is low, an area is reduced, with which a port communicating with a reservoir and being open to a master cylinder communicates with the master cylinder, so that sufficient reaction force is transmitted from a piston of the master cylinder to a valve mechanism, thus preventing vibration and noise in the valve mechanism.

Briefly, according to the present invention, there is provided a vacuum booster of a brake device comprising a master cylinder having a piston slidably fitted in a cylinder having a port communicating with a reservoir, so that the port is closed by forward movement of the piston to transmit liquid pressure from the cylinder; the vacuum booster to boost a force for operating a brake to push and move the piston; a wheel cylinder supplied with the liquid pressure from the master cylinder to operate a braking unit of each of the wheels; and an liquid pressure generating unit to pump and supply brake liquid stored in the reservoir to the wheel cylinder through the port by using a pump, in which the vacuum booster comprises: a booster shell defining a pressure chamber therein; a partition member provided in the booster shell so as to be movable forwards and backwards, and partitioning the pressure chamber into a variable pressure chamber and a negative pressure chamber; a valve piston coupled to the partition member; an input member provided in the valve piston so as to be movable forwards and backwards relative to the valve piston; a valve mechanism including an atmospheric valve seat and a negative pressure valve seat respectively provided in the input member and the valve piston, an atmospheric valve removably contacting the atmospheric valve seat to communicate or isolate the variable pressure chamber with or from an atmosphere, and a negative pressure valve removably contacting the negative pressure valve seat to communicate or isolate the variable pressure chamber with or from the negative pressure chamber; an output member provided in the valve piston so as to be movable forwards and backwards relative to the valve piston, which pushes and moves the piston with forward movement of the valve piston; reaction applying means for transmitting part of reaction force that is transmitted from the piston to the output member to the input member; and stop position shifting means for shifting a stop position of the piston, at which the piston is prevented from being moved backwards by the output member when the valve piston is at a non-operating position, such that the stop position of the piston at high temperature is set ahead of the stop position at low temperature, thus reducing an area with which the port and the cylinder communicate with each other.

With this construction, when the temperature is low, while the valve piston is at a non-operating position, the stop position, at which the piston of the master cylinder is prevented from being moved further backwards by the output rod, is shifted forwards by the stop position shifting means, thus reducing the area with which the port communicating with the reservoir and being open to the cylinder communicates with the cylinder. Thereby, when the piston is pushed and moved forwards by the output member of the vacuum booster, the port is immediately isolated from the cylinder, so that the generation of liquid pressure in the cylinder begins at the initial stage of the braking operation, thus the reaction force is transmitted from the piston to the output rod, thereby preventing vibration or noise in the valve mechanism.

Meanwhile, when the temperature is low, while the valve piston is at the non-operating position, the stop position of the piston is not shifted forwards, so that the area with which the port communicates with the cylinder is increased and maintained wide. Therefore, when the master cylinder is in the non-operating state, the liquid pressure generating unit is able to pump brake liquid from the reservoir through the port by using the pump to rapidly supply it to the wheel cylinder. Furthermore, because the viscosity of the brake liquid is low when the temperature is low, even though the piston is not moved forward by the output rod of the vacuum booster and communication between the port and the cylinder is maintained, the generation of liquid pressure in the cylinder begins at the initial stage of the braking operation, and the reaction force is transmitted from the piston to the output rod, thus preventing vibration or noise in the valve mechanism.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENT

Figure 1:
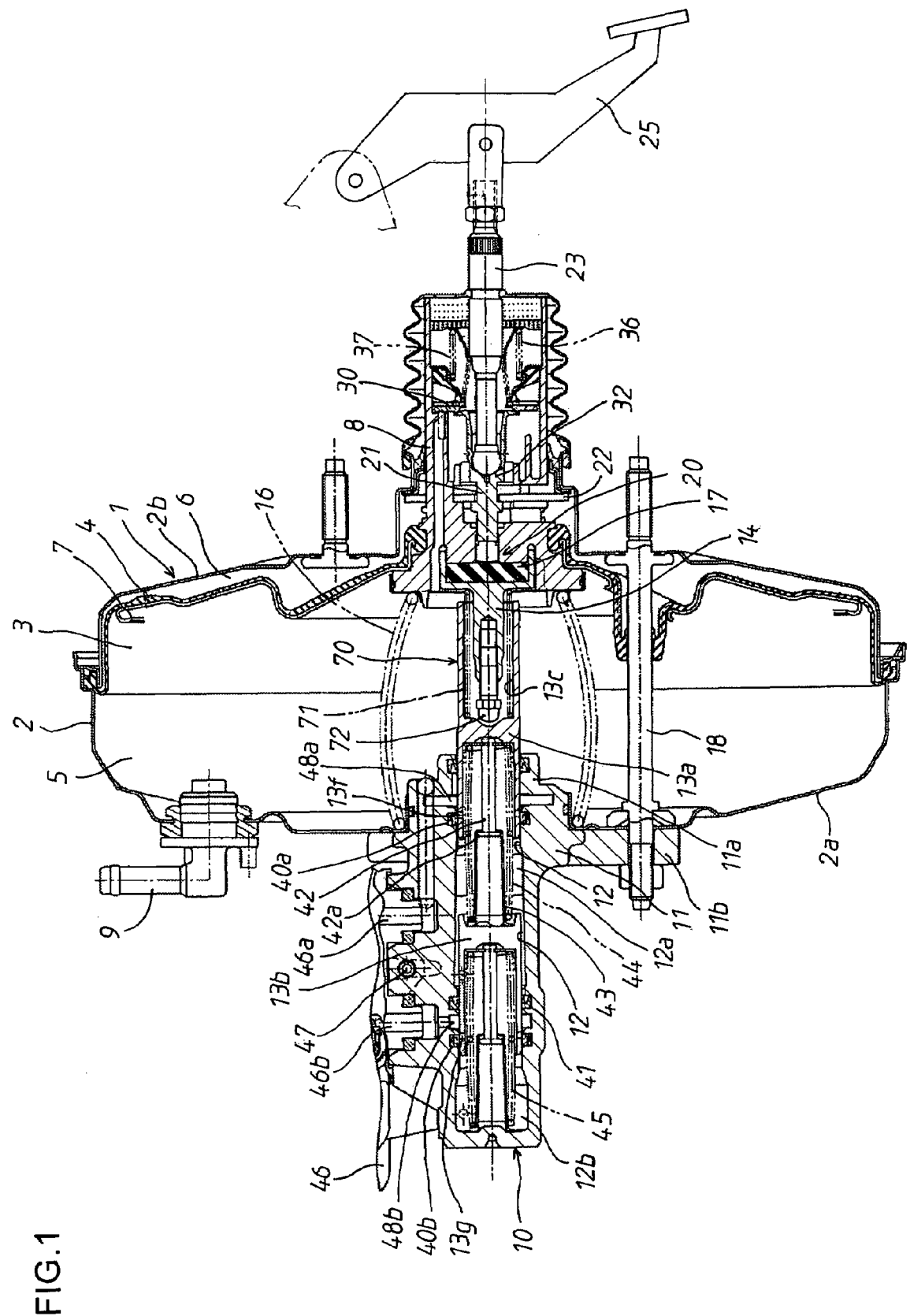
FIG. 1 is a sectional view illustrating a first embodiment of a vacuum booster of a brake device according to the present invention.

Hereinafter, a preferred embodiment of a vacuum booster according to the present invention will be described with reference to the drawings. As shown in FIG. 1, a booster shell 2 includes a front booster shell 2a and a rear booster shell 2b. A flexible diaphragm 4, which serves as a partition member, is air-tightly provided between the two booster shells 2a and 2b by using a bead provided on the circumferential outer edge of the flexible diaphragm 4, and partitions the pressure chamber 3 in the booster shell 2 into a negative pressure chamber 5 and a variable pressure chamber 6. A disk-shaped plate 7 is coupled to the diaphragm 4 in the negative pressure chamber 5. The circumferential outer surface of a base end 8a of a valve piston 8, having a cylindrical shape, is air-tightly fastened to the diaphragm 4 and the disk-shaped plate 7. Thus, the front end surface of the base end 8a is exposed to the negative pressure chamber 5. Furthermore, a negative pressure guide port 9 is provided to the front booster shell 2a. The negative pressure chamber 5 communicates with the intake manifold of an engine through the negative pressure guide port 9, and is maintained in a negative pressure state while the engine is operated.

Figure 2:
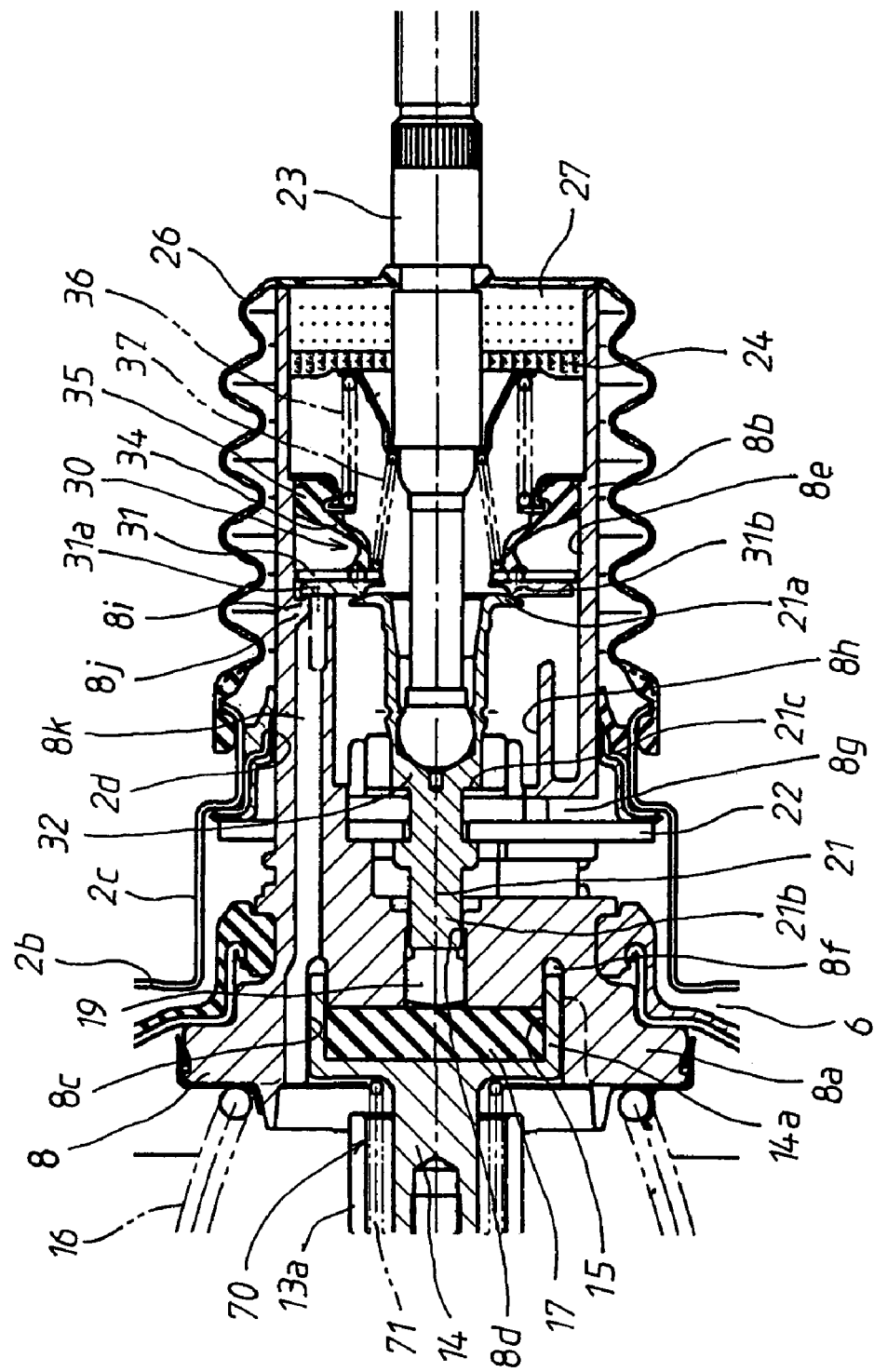
FIG. 2 is a sectional view showing an enlargement of a valve mechanism of the vacuum booster of FIG. 1.

As shown in FIG. 2, a cylindrical protruding part 2c, which is formed by bending the central portion of the rear booster shell 2b outwards, extends a predetermined length backwards from the central portion of the rear booster shell 2b. A through hole 2d is formed through the protruding part 2c along an axis thereof. In the valve piston 8, a sliding cylindrical part 8b extends backwards from the base end 8a. The sliding cylindrical part 8b passes through the through hole 2d and protrudes backwards from the protruding part 2c of the rear booster shell 2b. A seal is interposed between the circumferential inner surface of the through hole 2d and the circumferential outer surface of the sliding cylindrical part 8b in order to isolate the variable pressure chamber 6 from the atmosphere.

In FIG. 1, the reference numeral 10 denotes a master cylinder. The rear end 11a of a cylinder body 11 of the master cylinder 10 air-tightly protrudes into the negative pressure chamber 5 through a central hole that is formed through the front booster shell 2a. A flange part 11b of the cylinder body 11 is in contact with the front surface of the front booster shell 2a. The front booster shell 2a and the rear booster shell 2b are coupled to each other and are fastened to the cylinder body 11 by a plurality of tie-rods 18, for example two, which are disposed at approximately medial positions between the central axis and the outer edge of the booster shell 2 and extend parallel to the central axis of the booster shell 2. In addition, sliding holes of sealed parts provided on the diaphragm 4 are air-tightly and slidably fitted over respective tie-rods 18 so as to maintain air-tightness between the negative pressure chamber 5 and the variable pressure chamber 6, which are partitioned from each other.

Reference numeral 13a denotes a first piston fitted in a cylinder 12 formed in the cylinder body 11 so as to be slidable forwards and backwards. The first piston 13a protrudes from the rear end of the cylinder 12 into the negative pressure chamber 5 and extends to a position adjacent to the front end surface of the valve piston 8. An output rod 14, which serves as an output member, is provided between the valve piston 8 and the first piston 13a. The valve piston 8 transmits the output of the diaphragm 4 to the output rod 14 through a reaction member 17, based on the pressure difference between the negative pressure chamber 5 and the variable pressure chamber 6. The output rod 14 pushes and moves the first piston 13a forwards. A return spring 16 is interposed between the front booster shell 2a and the front end surface of the valve piston 8, thus pressing the valve piston 8 backwards.

As shown in FIG. 2, a reaction chamber hole 8c, a reaction hole 8d having a small diameter and being open towards the reaction chamber hole 8c, a plunger receiving hole 8h, and a valve body receiving hole 8e having a diameter larger than that of the plunger receiving hole 8h, are formed through the valve piston 8 and linearly arranged along the central axis thereof from the front end to the rear end. A ring-shaped groove 8f, the inner surface of which is continuous with the circumferential inner surface of the reaction chamber hole 8c, is axially formed in the bottom of the reaction chamber hole 8c. A ring-shaped protrusion 14a, which is provided on the rear end of the output rod 14, is fitted in the ring-shaped groove 8f so as to be axially movable. Thus, a reaction chamber 15 is defined between the rear end surface of the output rod 14, the circumferential inner surface of the ring-shaped protrusion 14a and the bottom of the reaction chamber hole 8c. A disk-shaped reaction member 17 made of an elastic substance is received in the reaction chamber 15.

The reference numeral 21 denotes a plunger received in the plunger receiving hole 8h so as to be movable forwards and backwards. An atmospheric valve seat 21a is provided around the rear end surface of the plunger 21. The front end shaft 21b of the plunger 21 is fitted in the reaction hole 8d. The front end surface of the front end shaft 21b is in contact with the rear end surface of an insert member 19 that is slidably fitted in the reaction hole 8d. A reaction applying means 20 comprises the output rod 14, the reaction chamber 15, the reaction member 17, the reaction hole 8d and the plunger 21.

The reference numeral 22 denotes an H-shaped key member. The relative moving distance of the plunger 21 relative to the valve piston 8 is limited by the key member 22. Inner ends of opposite linear parts of the key member 22 are placed in a ring-shaped depression 21c, which is formed on the plunger 21, so as to be movable forwards and backwards relative to the plunger 21 within a predetermined range. Opposite ends of the key member 22 extend outside rectangular holes 8g, which are formed in the valve piston 8 in radial directions, such that the outer surfaces of the opposite linear parts of the key member 22 slidably contact the respective rectangular holes 8g. Therefore, the valve piston 8 and the plunger 21 are relatively movable in an axial direction with respect to each other within a range remaining after a length twice as long as the thickness of the key member 22 is subtracted from the sum of the width of the rectangular hole 8g and the width of the ring-shaped depression 21c.

Furthermore, the opposite ends of the key member 22, which protrude from the outer surface of the valve piston 8, contact the inner end surface of the protruding part 2c of the rear booster shell 2b in order to limit backward movement of the valve piston 8. Thus, the key member 22 restrained its backward movement relative to the booster shell 2, contacts the front end surfaces of the opposite rectangular holes 8g so that the valve piston 8 is maintained at its non-operating position and, simultaneously, the key member 22 contacts the front end surface of the ring-shaped depression 21c so that the plunger 21 is maintained at its non-operating position.

Meanwhile, an input rod 23 is pivotably coupled to the rear end of the plunger 21. The input rod 23 passes both through a filter 24, which prevents dust from penetrating, and through a silencer 27 having a sound-absorption function and extends backwards from the rear end of the sliding cylindrical part 8b.

The input rod 23 is coupled to a brake pedal 25. An input member 32 is constructed by the plunger 21 and the input rod 23 such that it is axially movable by the brake pedal 25. A bellows 26, which covers the circumferential outer surface of the sliding cylindrical part 8b of the valve piston 8, is provided between the input rod 23 and the protruding part 2c of the rear booster shell 2b.

A valve mechanism 30, which causes the variable pressure chamber 6 to communicate with the negative pressure chamber 5 or with the atmosphere, includes the atmospheric valve seat 21a and a negative valve seat 8i respectively provided on the plunger 21 and the valve piston 8, an atmospheric valve 31b brought into contact with or separated from the atmospheric valve seat 21a to cause the variable pressure chamber 6 to communicate with the atmosphere or isolate it therefrom, and a negative pressure valve 31a brought into contact with or separated from the negative pressure seat 8i to cause the variable pressure chamber 6 to communicate with the negative pressure chamber 5 or isolate it therefrom. The atmospheric valve 31b and the negative pressure valve 31a are provided in a valve body 31 received in the valve body receiving hole 8e so as to be movable forwards and backwards.

That is, two curved-ellipse-shaped planar surfaces 8j are provided on a stepped portion, which is provided between the plunger receiving hole 8h and the valve body receiving hole 8e of the valve piston 8. The negative pressure valve seat 8i extends from each planar surface 8j and is symmetrical with respect to the central axis of the valve mechanism. The negative pressure valve seat 8i is formed by extending a protrusion along the periphery of the curved-ellipse-shaped planar surfaces 8j, the center of which is on the central axis of the valve mechanism. A passage 8k, which is surrounded by the negative pressure seat 8i, passes through the sidewall of the valve piston 8 and communicates with the negative pressure chamber 5.

The rear end of the valve body 31 is coupled to a ring-shaped support member 35 through a bellows 34, which permits axial movement of the valve body 31. The support member 35 is fitted in the circumferential inner surface of the valve body receiving hole 8e and is pressed against a shoulder part of the valve body receiving hole 8e by the elastic force of a compression spring 36, which is interposed between the support member and a spring shoe coupled to the intermediate stepped portion of the input rod 23. The valve body 31 is biased forwards by the elastic force of a compression spring 37, which is interposed between the valve body and the intermediate part of the input rod 23. The plunger receiving hole 8h communicates with the variable pressure chamber 6 through the rectangular hole 8g.

The first piston 13a and a second piston 13b are slidably fitted in the cylinder 12 of the master cylinder 10. A first liquid-tight sealing member 40a, which is prevented from moving axially, is provided in the rear portion of the cylinder 12. The first piston 13a is liquid-tightly fitted in the first liquid-tight sealing member 40a. The first and second pistons 13a and 13b in the cylinder 12 are separated from each other by a first liquid pressure chamber 12a, which supplies brake liquid pressure to a first brake system. A second liquid-tight sealing member 40b, which is prevented from axially moving, is provided in the front portion of the cylinder 12. The second piston 13b is liquid-tightly fitted in the second liquid-tight sealing member 40b. There is provided between the front end of the cylinder 12 and the second piston 13b a second liquid pressure chamber 12b, which supplies brake liquid pressure to a second brake system. The reference numeral 41 denotes a sealing member, which is prevented from axially moving in the cylinder 12 and is provided between the first and second liquid-tight sealing member 40a and 40b. The sealing member 41 is liquid-tightly fitted over the second piston 13b, and isolates the first and second liquid pressure chambers 12a and 12b from each other.

A rod 42 having an engagement portion 42a extends a predetermined length forwards from the bottom of a front shaft hole, which is formed in the front end of the first piston 13a along the central axis thereof. The reference numeral 43 denotes a spring seat having a bell shape. A hole formed in the rear end of the spring seat 43 is guided to the rod 42. The spring seat 43 contacts the engagement portion 42a of the rod 42, so that forward movement thereof is limited. The reference numeral 44 denotes a first compression spring previously compressed and interposed between a flange, which extends outwards from the front end of the spring seat 43, and the bottom of the front axial hole of the first piston 13a. The first compression spring 44 separates the first and second pistons 13a and 13b from each other with a first set elastic force until the spring seat 43 contacts the engagement portion 42a of the rod 42. The reference numeral 45 denotes a second compression spring interposed between the bottom of a front axial hole, formed in the front end of the second piston 13b along the central axis thereof, and the front end of the cylinder 12. The second compression spring 45 urges the second piston 13b with a second set elastic force, which is less than the first set elastic force, and brings the second piston 13b into contact with the spring seat 43.

A reservoir 46 is fastened to the upper end of the cylinder body 11 by a pin 47. First and second outlets 46a and 46b, which are formed through the bottom of the reservoir 46, communicate with first and second ports 48a and 48b, which are provided at the upper side of the cylinder body 11 and are respectively open to the cylinder 12 to supply brake liquid into the first and second liquid pressure chambers 12a and 12b. The first port 48a is open to the cylinder 12 behind the first liquid-tight sealing member 40a. When the first piston 13a is positioned at the non-operating position, the first port 48a communicates with the first liquid pressure chamber 12a through a supply hole 13f, which is radially formed in the first piston 13a towards the front axial hole thereof. The second port 48b is open to the cylinder 12 behind the second liquid-tight sealing member 40b. When the second piston 13b is positioned at the non-operating position, the second port 48b communicates with the second liquid pressure chamber 12b through a supply hole 13g, which is radially formed in the second piston 13b towards the front axial hole thereof.

Figure 3:
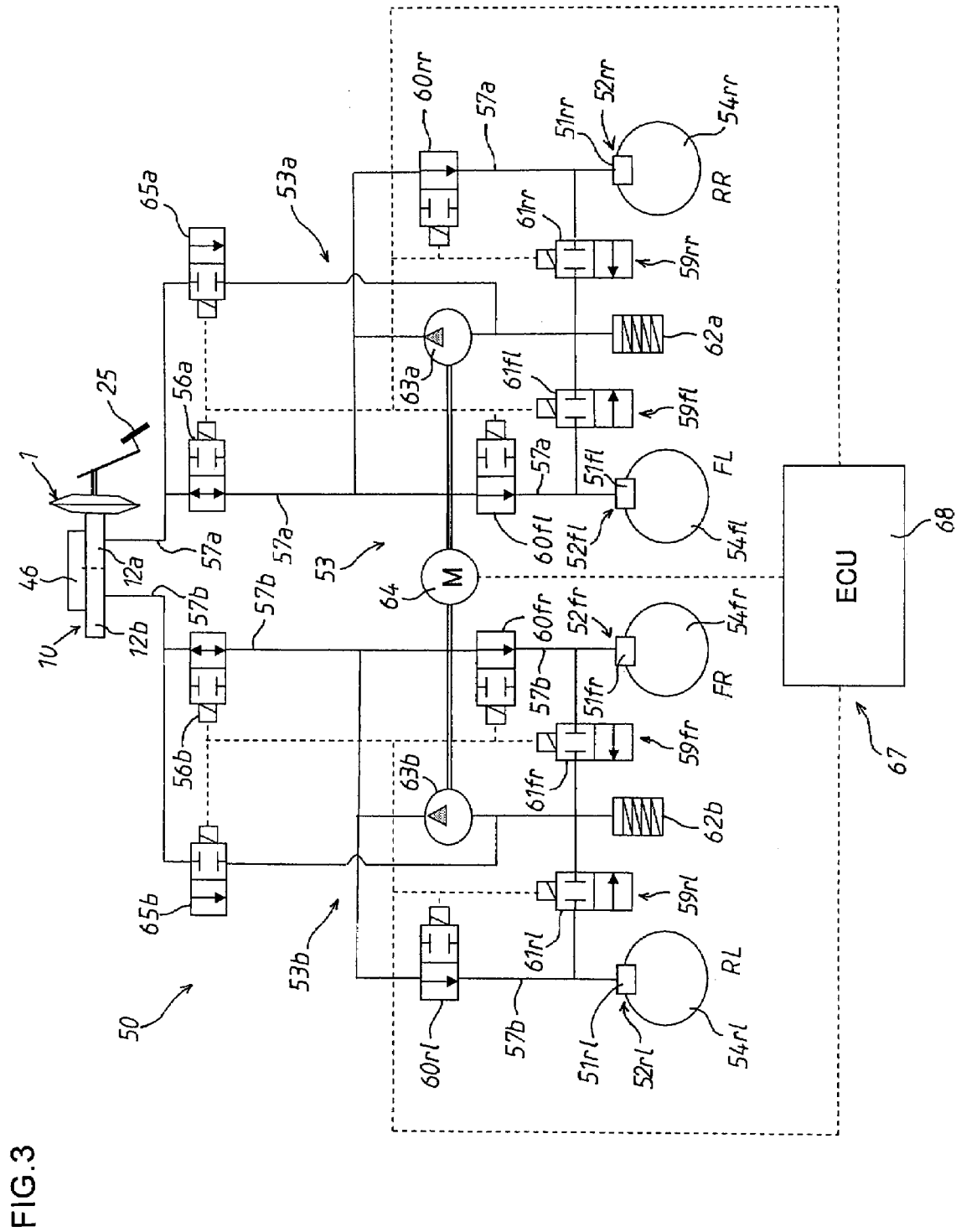
FIG. 3 is a view showing a brake system having the vacuum booster of the brake device according to the present invention.

Hereinafter, a brake device 50 will be described in detail with reference to FIG. 3. The brake device 50 includes the above-mentioned vacuum booster 1 boosting the brake manipulating force applied to the brake pedal 25 and pushing and moving the first piston 13a of the master cylinder 10, a braking unit 52 having a wheel cylinder 51 for a wheel, to which liquid pressure is supplied from the master cylinder 10, and an liquid pressure generating unit 53 pumping brake liquid stored in the reservoir 46 by using a pump and supplying it to the wheel cylinder 51 through the first and second ports 48a and 48b.

In the brake device 50, the braking units 52 installed around the respective front, rear, left and right wheels 54 have the same construction and operation. Therefore, the same reference Arabic numerals denote the same elements, and the Roman characters f and r are used along with the Arabic numerals to distinguish between the front and rear elements. Furthermore, the characters l and r are used along with the characters f and r, which distinguish between the front and rear elements, in order to distinguish between the left and right elements corresponding to left and right wheels. In addition, in the specification, reference Arabic numerals may be used alone to denote the elements without distinguishing between the front, rear, left and right thereof.

When the brake pedal 25 is pushed, brake liquid having liquid pressure corresponding to the pressing force is transmitted from the first and second liquid pressure chambers 12a and 12b to passages 57a and 57b. The passages 57a and 57b, which are respectively connected to the first and second liquid pressure chambers 12a and 12b of the cylinder 12 through master cylinder-isolating electromagnetic on/off valves 56a and 56b, are branched into several sections on a downstream side relative to the master cylinder-isolating electromagnetic on/off valves 56a and 56b. The passages 57a and 57b are respectively connected to wheel cylinders 51rr, 51fl and 51rl, 51fr of the braking units 52rr, 52fl and 52rl, 52fr, such as disk brakes or drum brakes, which are respectively installed around a right rear wheel 54rr, a left front wheel 54fl, a left rear wheel 54rl and a right front wheel 54fr. Each braking unit 52 generates braking force for limiting the rotation of the corresponding wheel 54 by means of the operation of friction members, such as a brake pad and a brake shoe, thus braking the wheel 54. Liquid pressure control means 59rr, 59fl and 59rl, 59fr are connected to the sections branched from the passages 57a and 57b. The liquid pressure control means 59rr, 59fl and 59rl, 59fr are constituted such that electromagnetic on/off valves 60rr, 60fl and 60rl, 60fr are provided on the branched sections of the passages 57a and 57b, and electromagnetic on/off valves 61rr, 61fl and 61rl, 61fr that are connected to respective subsidiary reservoirs 62a and 62b, are connected to respective electromagnetic on/off valves 60rr, 60fl and 60rl, 60fr and the wheel cylinders 51rr, 51fl and 51rl, 51fr, Each subsidiary reservoir 62a, 62b includes a casing having a bottom, and a piston liquid-tightly installed in the casing and pushed by a compression spring having a small elastic force. The liquid pressure control means 59, which is connected to each passage 57, includes the electromagnetic on/off valves 60 and 61. The liquid pressure in each wheel cylinder 51 is increased, maintained constant, or reduced by the control of the electromagnetic on/off valves 60 and 61.

The reference numerals 63a and 63b denote pumps to be operated by motors 64. Outlet ports of the pumps 63a and 63b are respectively connected to the passages 57a and 57b between the electromagnetic on/off valves 60rr, 60fl and 60rl, 60fr and the master cylinder-isolating electromagnetic on/off valves 56a and 56b. Inlet ports of the pumps 63a and 63b are connected to the respective subsidiary reservoirs 62a and 62b. Furthermore, the inlet ports of the pumps 63a and 63b are respectively connected to the first and second liquid pressure chambers 12a and 12b through electromagnetic on/off valves 65a and 65b upstream of the master cylinder-isolating electromagnetic on/off valves 56a and 56b.

The liquid pressure generating unit 53 includes the pump 63, the motor 64, the master cylinder-isolating electromagnetic on/off valve 56 and the electromagnetic on/off valves 65 and so on. When the master cylinder 10 is in a non-operating state, the liquid pressure generating units 53a and 53b are able to pump brake liquid, which has been stored in the reservoir 46, by using the pumps 63a and 63b through the first and second ports 48a and 48b and supply it to the wheel cylinder 51.

The reference numeral 67 denotes a stability control device for stabilizing the travel of the vehicle. The stability control device 67 includes the liquid pressure generating unit 53, the liquid pressure control means 59, an electronic control unit 68 and so on. For example, depending on the difference between a real yaw rate detected by a yaw rate sensor, and a target yaw rate calculated from both the front steered angle of the front wheels detected by a steered angle sensor and the vehicle speed detected by a vehicle speed sensor, the stability control device 67 supplies brake liquid by using the pump 63 to the wheel cylinder 51 of the wheel 54 that requires braking force for preventing the vehicle from skidding in a transverse direction, and controls the electromagnetic on/off valves 60 and 61 to control the liquid pressure in the wheel cylinder 51. The electronic control unit 68 mainly includes a microcomputer, which has a CPU, ROM, RAM, and input and output units. The stability control device 67 may also have an inter-vehicle distance control function such that, when the distance between the vehicle and the vehicle immediately in front thereof is a predetermined value or less, the pressure of brake liquid discharged from the liquid pressure generating unit 53 is controlled by the liquid pressure control means 59, thus maintaining the distance between the vehicles at the predetermined value or more.

In the brake device 50, when the master cylinder 10 is in the non-operating state, the area with which the first and second ports 48a and 48b, which communicate with the reservoir 46 and are open to the cylinder 12, communicate with the respective first and second liquid pressure chambers 12a and 12b are maintained wide in order to rapidly supply brake liquid from the reservoir 46 to the wheel cylinder 51 through the first and second ports 48a and 48b by using the liquid pressure generating unit 53 when the temperature is low and the viscosity of the brake liquid is high. Thus, in the case where the temperature is high and the viscosity of the brake liquid is low, when the master cylinder 10 is in an operating state, the distance that the first piston 13a is moved forwards until liquid pressure is generated in the first liquid pressure chamber 12a becomes long, in which the first port 48a is closed by the forward movement of the first piston 13a, pushed by the output rod 14 of the vacuum booster 1. Therefore, at the initial stage of the operation of the brake, reaction force transmitted from the piston (13a) to the output member (14) becomes small, and thus the valve mechanism 30 easily vibrates.

To overcome this, there is provided a stop position shifting means 70, which is constructed such that, when the valve piston 8 is at the non-operating position, the stop position of the first piston 13a, at which the first piston 13a is prevented from being moved further backwards by the output rod 14, is shifted such that the stop position of the first piston 13a at high temperature is set ahead of the position at low temperature, thus reducing the area with which the first port 48a and the first liquid pressure chamber 12a communicate with each other.

Figure 4:
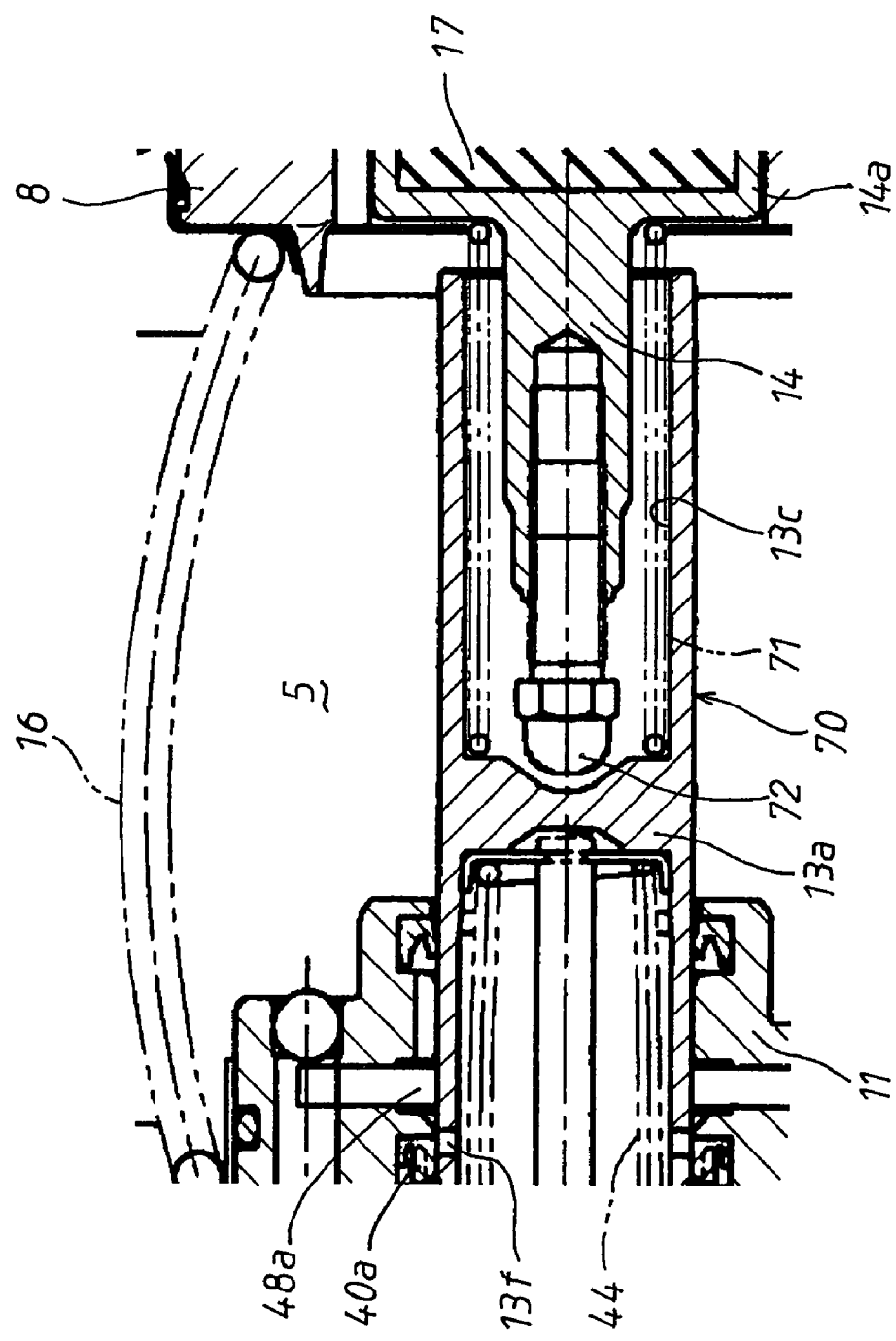
FIG. 4 is an enlarged sectional view illustrating a first embodiment of a stop position shifting means.

As shown in FIG. 4, in a first embodiment of the stop position shifting means 70, an axial hole 13c is axially formed in the rear end of the first piston 13a. A compression spring 71, which is an elastic member 71 made of a shape memory alloy, is interposed between the bottom of the axial hole 13c and the back surface of the rear end of the output rod 14, in which the ring-shaped protrusion 14a is provided. When the temperature is high, the compression spring 71 is returned to the memorized shape. Therefore, when the valve piston 8 and the output rod 14 are at non-operating positions, the stop position of the first piston 13a, at which the first piston 13a is prevented from being moved further backwards by the output rod 14, is shifted forwards by the elastic force of the compression spring 71. Thereby, parts of the supply holes 13f and 13g are closed by the first and second liquid-tight sealing members 40a and 40b, so that the area with which the first and second ports 48a and 48b communicate with the respective first and second liquid pressure chambers 12a and 12b is reduced. Thus, when the first piston 13a is pushed and moved forwards by the output rod 14 of the vacuum booster 1, the first port 48*a* is immediately isolated from the first liquid pressure chamber 12*a* by the first piston 13*a*, so that the generation of liquid pressure in the first liquid pressure chamber 12*a* of the cylinder 12 begins at the initial stage of the braking operation, and the reaction force is thus transmitted from the first piston 13*a* to the output rod 14. As mentioned above, the first embodiment of the stop position shifting means 70 has a simple construction in which the elastic member 71 made of a shape memory alloy is just interposed between the piston 13*a* and the output member 14.

When the temperature is low, the compression spring 71 made of a shape memory alloy is shortened due to the property of the shape memory alloy compared to when the temperature is high. Therefore, when the valve piston 8 and the output rod 14 are at non-operating positions, the first piston 13*a* is moved backwards by the elastic force of the second compression spring 45 of the master cylinder 10, until the bottom of the axial hole 13*c* is brought into contact with a contact part 72 provided on the front end of the output rod 14. Thereby, the parts of the supply holes 13*f* and 13*g* are not closed by the respective first and second liquid-tight sealing members 40*a* and 40*b*. Hence, the area, with which the first and second ports 48*a* and 48*b* communicate with the first and second liquid pressure chambers 12*a* and 12*b*, is maintained wide. Accordingly, when the master cylinder 10 is in the non-operating state, the liquid pressure generating unit 53 is able to pump brake liquid from the reservoir 46 through the first and second ports 48*a* and 48*b* by using the pumps 63*a* and 63*b* to rapidly supply it to the wheel cylinder 51. When the temperature is low, the viscosity of brake liquid is low. Therefore, when the first piston 13*a* is moved forward by the output rod 14 of the vacuum booster, the liquid pressure is generated in the first liquid pressure chamber 12*a* from the initial stage of the braking operation and the reaction force is transmitted from the first piston 13*a* to the output rod 14 although the first port 48*a* is not isolated from the first liquid pressure chamber 12*a*.

Furthermore, because the stop position of the first piston 13*a*, at which the output rod 14 prevents the first piston 13*a* from being moved backwards, is set by the contact part 72 limiting the backward movement of the first piston 13*a*, the distance that the first piston 13*a* is moved until the first port 48*a* is isolated from the first liquid pressure chamber 12*a* can be precisely set, so that the time at which the reaction force is transmitted to the output rod 14 can be appropriately set. Thereby, vibration and noise can be reliably prevented from being generated in the valve mechanism 50.

The operation of the brake device 50 according to the embodiment described above will be explained herein below. When the brake pedal 25 is pushed, the plunger 21 is moved forwards by the input rod 23 against the elastic force of the compression spring 36, so that the valve body 31 is moved forwards by the elastic force of the compression spring 37. Then, the negative pressure valve 31*a* is brought into contact with the negative pressure valve seat 8*i*, thus isolating the variable pressure chamber 6 and the negative pressure chamber 5 from each other.

When the plunger 21 is further moved forwards, the atmospheric valve seat 21*a* is separated from the atmospheric valve 31*b*, and outside air supplied into the valve piston 8 through the silencer 27 and the filter 24 is drawn into the variable pressure chamber 6 through the plunger receiving hole 8*h* and the rectangular hole 8*g*. Therefore, the pressure difference between the variable pressure chamber 6 and the negative pressure chamber 5 is generated. Thus, the valve piston 8 moves forwards and compresses the return spring 16 due to the pressure difference between the variable pressure chamber 6 and the negative pressure chamber 5 applied to the diaphragm 4. In addition, the valve piston 8 elastically deforms the reaction member 17 with the operating force generated by the pressure difference and pushes and moves the first piston 13*a* through the output rod 14.

The reaction member 17 compressed and elastically deformed by the valve piston 8 is drawn into the reaction hole 8*d*, so that the front end of the front end shaft 21*b* of the plunger 21 is pushed backwards through the insert member 19. Thereby, the plunger 21 is moved backwards, and the atmospheric valve seat 21*a* is brought into contact with the atmospheric valve 31*b*, thus isolating the variable chamber 6 from the atmosphere. Then, brake liquid pressure due to pedal force of the brake pedal 25 is generated and maintained in the first and second liquid pressure chambers 12*a* and 12*b*. The force of pushing the brake pedal 25 is transmitted from the front end shaft 21*b* of the plunger 21 to the reaction member 17 through the input rod 23. Thus, because the reaction member 17 is elastically deformed by the pedal force, a driver can feel the reaction force.

In the case where the temperature is low, when the valve piston 8 and the output rod 14 are at the non-operating positions, because the compression spring 17 is returned to the memorized shape and thus pushes the first piston 13*a* forwards, the stop position of the first piston 13*a* is shifted forwards. Thereby, the parts of the supply holes 13*f* and 13*g* are closed by the first and second liquid-tight sealing members 40*a* and 40*b*, so that the area, with which the first and second ports 48*a* and 48*b* communicate with the respective first and second liquid pressure chambers 12*a* and 12*b*, is reduced. Therefore, when the first piston 13*a* is moved forwards by the output rod 14 of the vacuum booster 1, the first port 48*a* is immediately isolated from the first liquid pressure chamber 12*a*. Thereby, liquid pressure is rapidly generated in the first liquid pressure chamber 12*a* of the cylinder 12 from the initial stage of the braking operation, so that the reaction force is transmitted from the first piston 13*a* to the output rod 14, thus preventing the vibration or noise of the valve mechanism 50.

In the case where the temperature is low, while the valve piston 8 and the output rod 14 are at the non-operating positions, the first piston 13*a* is moved backwards by the elastic force of the second compression spring 45 of the master cylinder 10, until the bottom of the axial hole 13*c* is brought into contact with a contact part 72 provided on the front end of the output rod 14 because when the temperature is low the compression spring 71 is shortened due to the property of the shape memory alloy compared to when the temperature is high. Thereby, the parts of the supply holes 13*f* and 13*g* are not covered with the respective first and second liquid-tight sealing members 40*a* and 40*b*. However, when the temperature is low, the viscosity of the brake liquid is low. Therefore, when the first piston 13*a* is moved forward by the output rod 14 of the vacuum booster 1, the liquid pressure is generated in the first liquid pressure chamber 12*a* from the initial stage of the braking operation and the reaction force is transmitted from the first piston 13*a* to the output rod 14 although the first port 48*a* is not isolated from the first liquid pressure chamber 12*a*. Thereby, vibration and noise can be prevented from being generated in the valve mechanism 50.

When the brake pedal 25 is released after the braking operation, the plunger 21 is moved backwards with respect to the valve piston 8 by the elastic force of the compression spring 36. Then, in the state in which the atmospheric valve seat 21*a* contacts the atmospheric valve 31*b*, the valve body 31 is moved backwards with respect to the valve piston 8 against the elastic force of the compression spring 37.

Thus, the negative pressure valve 31*a* is moved apart from the negative pressure valve seat 8*i*. Thereby, the negative pressure in the negative pressure chamber 5 is applied to the variable pressure chamber 6 through the passage 8*k*, so that the pressure difference between the variable pressure chamber 6 and the negative pressure chamber 5 is removed. The valve piston 8, the plate 7 and the diaphragm 4 are moved backwards by the elastic force of the return spring 16, and the first and second pistons 13*a* and 13*b* are moved backwards, so that the liquid pressure in the first and second liquid pressure chambers 12*a* and 12*b* is relieved.

The plunger 21 is stopped at the moment that the key member 22 is brought into contact with the inner surface of the stepped portion of the protruding part 2*c* of the rear booster shell 2*b*. The valve piston 8 is brought into contact with the key member 22 and is thus stopped. Therefore, when the brake is in a non-operating state, the negative valve 31*a* is in a state in which it almost contacts the negative pressure valve seat 8*i* so that the negative pressure valve 31*a* is rapidly brought into contact with the negative valve seat 8*i* by forward movement of the valve body 31 when the braking operation is conducted.

When the brake pedal 25 is not pushed, and thus the master cylinder 10 is not operated, the stability control device 67 is operated, if necessary. In detail, the master cylinder-isolating electromagnetic on/off valves 56*a* and 56*b* are closed, the electromagnetic on/off valves 65*a* and 65*b* are opened, and the pumps 63*a* and 63*b* are operated by the motor 64. Thus, brake liquid is supplied from the pumps 63*a* and 63*b* to the wheel cylinder 51 of the wheel 54 that requires braking force, and the electromagnetic on/off valves 60 and 61 are turned on and off so as to control the liquid pressure in the wheel cylinder 51.

In the case where the temperature is low, when the valve piston 8 and the output rod 14 are in the non-operating positions, although the parts of the supply holes 13*f* and 13*g* are closed by the first and second liquid-tight sealing members 40*a* and 40*b*, the liquid pressure generating unit 53 is able to pump brake liquid from the reservoir 46 through the first and second ports 48*a* and 48*b* by using the pumps 63*s* and 63*b* thereby to rapidly supply it to the wheel cylinder 51 because the viscosity of the brake liquid is low.

In the case where the temperature is low, while the valve piston 8 and the output rod 14 are at the non-operating positions, the first piston 13*a* is moved backwards by the elastic force of the second compression spring 45 of the master cylinder 10 until it is brought into contact with the contact part 72 because when the temperature is low the compression spring 71 is shortened due to the property of the shape memory alloy compared to when the temperature is high. Thereby, the parts of the supply holes 13*f* and 13*g* are not covered with the first and second liquid-tight sealing members 40*a* and 40*b*. Therefore, the area, with which the first and second ports 48*a* and 48*b* communicate with the first and second liquid pressure chambers 12*a* and 12*b*, is maintained wide. Accordingly, the liquid pressure generating unit 53 is able to pump brake liquid from the reservoir 46 through the first and second ports 48*a* and 48*b* by using the pumps 63*a* and 63*b* to rapidly supply it to the wheel cylinder 51 when the master cylinder 10 is in the non-operating state.

Figure 5:
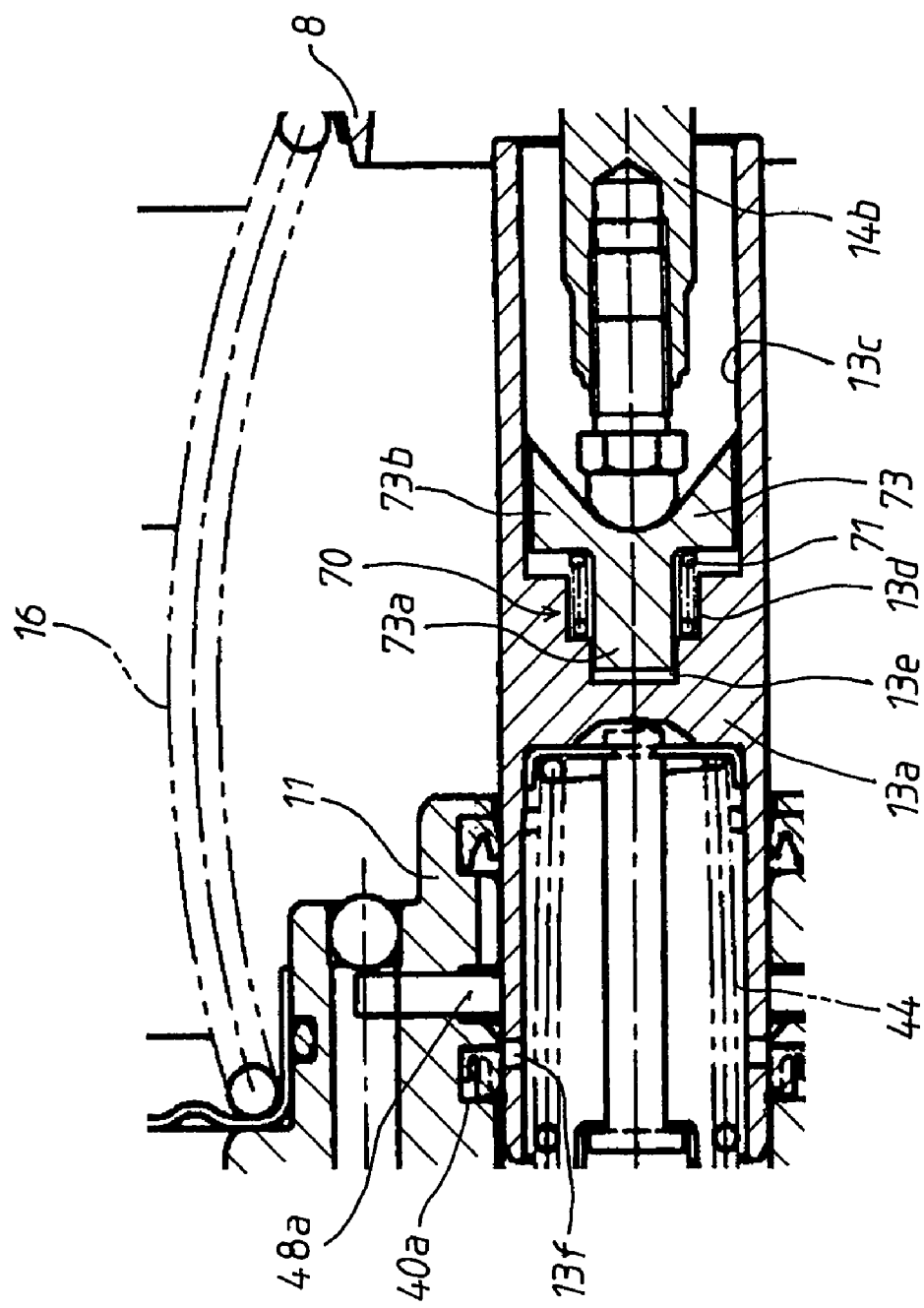
FIG. 5 is an enlarged sectional view illustrating a second embodiment of a stop position shifting means.

As shown in FIG. 5, in a second embodiment of the stop position shifting means 70, an axial hole 13*c* is axially formed in the rear end of the first piston 13*a*. A stepped hole 13*d* is formed in the bottom of the axial hole 13*c*. A contact shaft part 73*a* provided on the front end of a contact member 73 is slidably fitted in a small-diameter hole 13*e* of the stepped hole 13*d*. A compression spring 71, which is an elastic member made of a shape memory alloy, is interposed between the back surface of a head part 73*b* of the contact member 73 and the stepped portion of the stepped hole 13*d*. The head part 73*b* of the contact member 73 faces a rod part 14*b*, which extends forwards from the output rod 14.

When the temperature is high, the compression spring 71 is returned to the memorized shape. Therefore, when the valve piston 8 and the output rod 14 are at non-operating positions, the stop position of the first piston 13*a*, at which the first piston 13*a* is prevented from being moved further backwards by the output rod 14, is shifted forwards by the elastic force of the compression spring 71. Thereby, the parts of the supply holes 13*f* and 13*g* are closed by the first and second liquid-tight sealing members 40*a* and 40*b*, so that the area with which the first and second ports 48*a* and 48*b* communicate with the respective first and second liquid pressure chambers 12*a* and 12*b* is reduced.

When the temperature is low, the compression spring 71 is shortened due to the property of the shape memory alloy compared to when the temperature is high. Therefore, when the valve piston 8 and the output rod 14 are at non-operating positions, the first piston 13*a* is moved backwards by the elastic force of the second compression spring 45 of the master cylinder 10, until the bottom of the small-diameter hole 13*e* of the stepped hole 13*d* is brought into contact with the front end of the contact shaft part 73*a* of the contact member 73. Thereby, the parts of the supply holes 13*f* and 13*g* are not covered with the first and second liquid-tight sealing members 40*a* and 40*b*. The operation of the second embodiment of the stop position shifting means 70 is similar to that of the first embodiment, and therefore further explanation is not described. According to the second embodiment of the stop position shifting means 70 having the above-mentioned simple construction, can provide a vacuum booster 1 having the same effects as those of the first embodiment.

Figure 6:
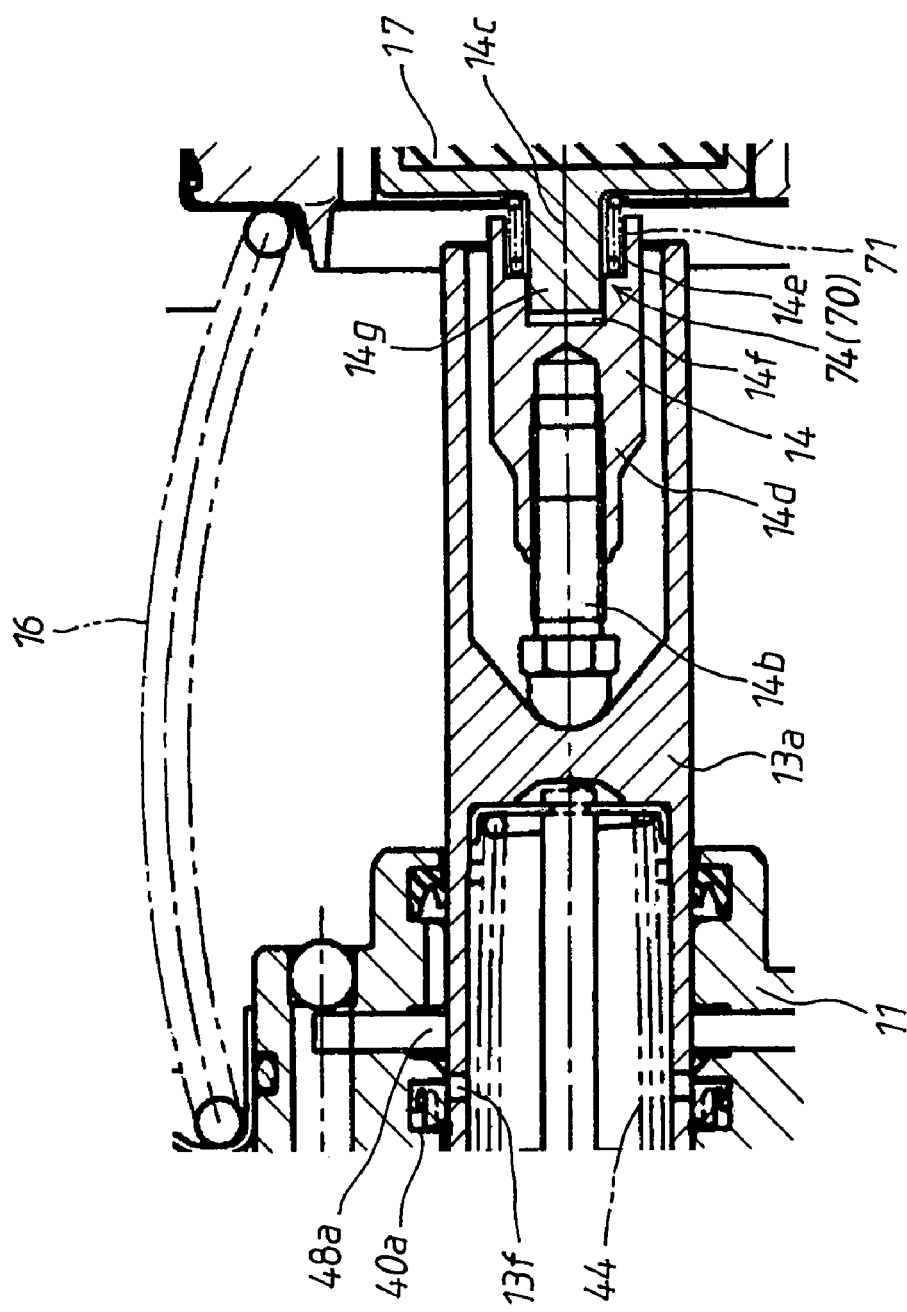
FIG. 6 is an enlarged sectional view illustrating a third embodiment of a stop position shifting means.

As shown in FIG. 6, in a third embodiment of the stop position shifting means 70, the output rod 14 is divided into a first output part 14*c* and a second output part 14*d*. The first output part 14*c* includes a ring-shaped protrusion 14*a*, which is fitted in the ring-shaped groove 8*f* of the valve piston 8. The second output part 14*d* includes a rod part 14*b*, which contacts the first piston 13*a*. In addition, a stepped hole 14*e* is formed in the rear end of the second output part 14*d*. A contact shaft part 14*g* provided on the back surface of the first output part 14*c* is slidably fitted in a small-diameter hole 14*f* of the stepped hole 14*e*. A compression spring 71, which is an elastic member made of a shape memory alloy, is interposed between a stepped portion of the stepped hole 14*e* and the back surface of the first output part 14*c*.

When the temperature is low, the compression spring 71 is returned to the memorized shape. Therefore, while the valve piston 8 is at a non-operating position, the second output part 14*d* is moved forwards by the compression spring 71 interposed between the first and second output part 14*c* and 14*d*. Thus, when the temperature is high the length of the output member 14 is increased compared to when the temperature is low. Then, the stop position of the first piston 13*a*, at which the first piston 13*a* is prevented from being moved further backwards by the second output part 14*d*, is shifted forwards. Thereby, the parts of the supply holes 13*f* and 13*g* are closed by the first and second liquid-tight sealing members 40*a* and 40*b*, so that the area with which the first and second ports 48*a* and 48*b* communicate with the respective first and second liquid pressure chambers 12*a* and 12*b* is reduced.

When the temperature is low, the compression spring 71 is shortened due to the property of the shape memory alloy compared to when the temperature is high. Therefore, when the valve piston 8 is at the non-operating position, the first piston 13a is moved backwards by the elastic force of the second compression spring 45 of the master cylinder 10, until the bottom of the small-diameter hole 14f of the stepped hole 14e is brought into contact with the front end of the contact shaft part 14g of the first output part 14c. Thereby, the parts of the supply holes 13f and 13g are not covered with the first and second liquid-tight sealing members 40a and 40b. The length changing means 74, for changing the length of the output member 14 such that the output member 14 is longer at high temperature than at low temperature, includes the first and second output parts 14c and 14d, the compression spring 71, the contact shaft part 14g and so on. The operation of the third embodiment of the stop position shifting means 70 is similar to that of the first embodiment, and therefore further explanation is not described. According to the third embodiment of the stop position shifting means 70 comprising the length changing means 74 that has the above-mentioned simple construction, in which the elastic member 71 is interposed between the first output part 14c and the second output part 14d, can provide a vacuum booster 1 having the same effects as those of the first embodiment.

Figure 7:
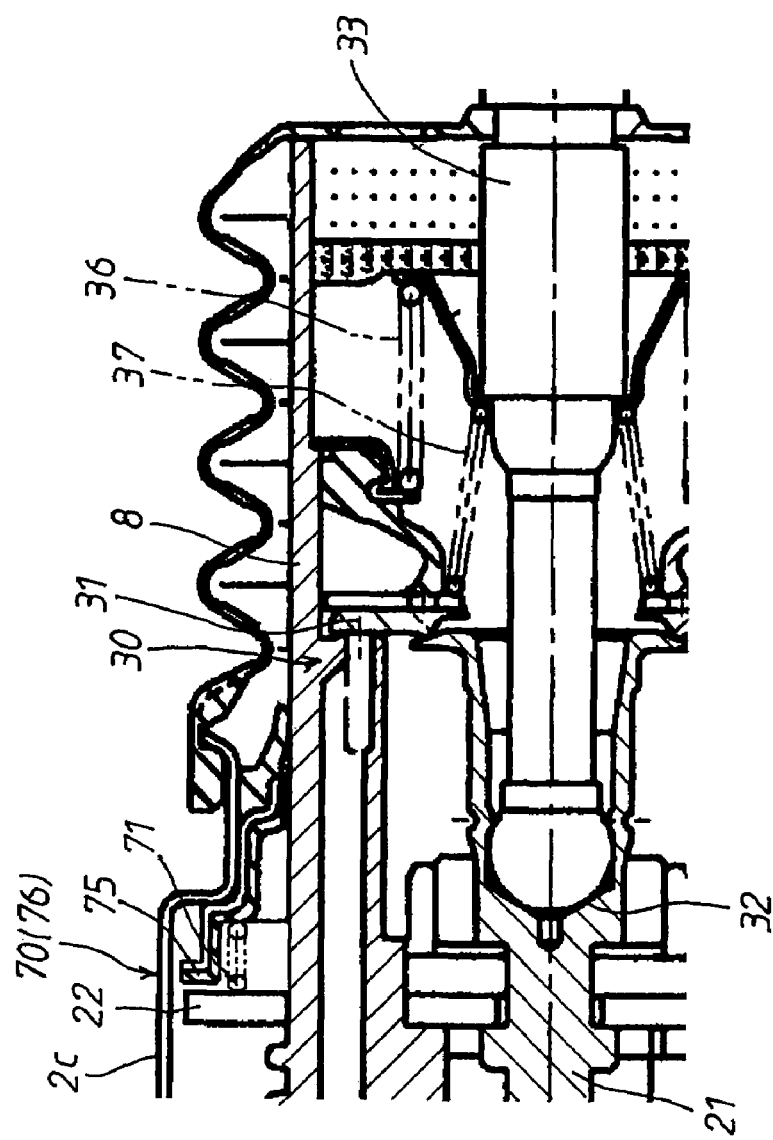
FIG. 7 is an enlarged sectional view illustrating a fourth embodiment of a stop position shifting means.

As shown in FIG. 7, in a fourth embodiment of the stop position shifting means 70, a compression spring 71, which is an elastic member made of a shape memory alloy, is interposed between the inner surface of the protruding part 2c of the rear booster shell 2b and the key member 22, which radially passes through the valve piston 8 and contacts the inner surface of the protruding part 2c to limit backward movement of the valve piston 8 and the input member 32 relative to the booster shell 2. Thus, when the temperature is high, the position at which the backward movement of the key member 22 is limited, is set ahead compared to when the temperature is low.

When the temperature is high, the compression spring 71 is returned to the memorized shape. Therefore, when the valve piston 8 is at a non-operating position, the key member 22 contacts the compression spring 71 abutting to the inner surface of the protruding part 2c, and thereby the key member 22 is stopped at the stop position shifted forwards. Hence, the stop position, at which the valve piston 8 is prevented from being moved further backwards by abutting to the key member 22, is shifted forwards. Then, the stop position of the first piston 13a, at which the first piston 13a is prevented from being moved further backwards by contacting the output rod 14 provided in the valve piston 8 is shifted forwards. Thereby, the parts of the supply holes 13f and 13g are closed by the first and second liquid-tight sealing members 40a and 40b, so that the area with which the first and second ports 48a and 48b communicate with the respective first and second liquid pressure chambers 12a and 12b is reduced.

When the temperature is low, the compression spring 71 is shortened due to the property of the shape memory alloy compared to when the temperature is high. Therefore, when the valve piston 8 is at the non-operating position, the key member 22 is moved backwards until it is brought into contact with a contact part 75, which is provided on the inner surface of the protruding part 2c of the rear booster shell 2b. Thus, the parts of the supply holes 13f and 13g are not covered with the first and second liquid-tight sealing members 40a and 40b. The non-operating position shifting means 76, for shifting the non-operating position of the valve piston 8 such that the non-operating position at high temperature is set ahead of that at low temperature, includes the key member 22, the compression spring 71, the contact part 75 and so on. The operation of the non-operating position shifting means 76, which is the fourth embodiment of the stop position shifting means 70, is similar to that of the first embodiment, and therefore further explanation is not described. According to the forth embodiment of the stop position shifting means 70 comprising the non-operating position shifting means 76 that has the above-mentioned simple construction, can provide a vacuum booster 1 having the same effects as those of the first embodiment.

And, in any of the embodiments, when the valve piston 8 is at a non-operating position at low temperature, the stop position of the piston 13a, at which the retraction thereof is limited by the output rod 14, is set by the contact part 72, 73a, 14g, 75 limiting the backward movement of the piston 13a. Therefore, the distance that the piston 13a is moved until the port 48a is isolated from the cylinder 12a can be precisely set. Thereby, the time at which the reaction force is transmitted to the output rod 14 can be appropriately set. Hence, vibration and noise can be reliably prevented from being generated in the valve mechanism 30.

While the invention has been shown and described with respect to the preferred embodiments, it will be understood by those skilled in the art that various changes and modifications may be made without departing from the spirit and scope of the invention as defined in the following claims.

Obviously, numerous modifications and variations of the present invention are possible in light of the above teachings. It is therefore to be understood that within the scope of the appended claims, the present invention may be practiced otherwise than as specifically described herein.

According to the seventh aspect of the present invention, when the valve piston is at a non-operating position at low temperature, the stop position of the piston, at which the retraction thereof is limited by the output member, is set by the contact part limiting the backward movement of the piston.

What is claimed is:

1. A vacuum booster (1) of a brake device (50) including: a master cylinder (10) having a piston (13a) slidably fitted in a cylinder (12a) having a port (48a) communicating with a reservoir (46), so that the port (48a) is closed by forward movement of the piston (13a) to transmit liquid pressure from the cylinder (12a); the vacuum booster (1) to boost a force for operating a brake to push and move the piston (13a); a wheel cylinder (51) supplied with the liquid pressure from the master cylinder (10) to operate a braking unit (52) of each of the wheels (54); and an liquid pressure generating unit (53) to pump and supply brake liquid stored in the reservoir (46) to the wheel cylinder (51) through the port (48a) by using a pump (63a), wherein the vacuum booster comprising:

a booster shell (2) defining a pressure chamber (3) therein;

a partition member (4) provided in the booster shell (2) so as to be movable forwards and backwards, and partitioning the pressure chamber (3) into a variable pressure chamber (6) and a negative pressure chamber (5);

a valve piston (8) coupled to the partition member (4);

an input member (32) provided in the valve piston (8) so as to be movable forwards and backwards relative to the valve piston (8);

a valve mechanism (30) including an atmospheric valve seat (21a) and a negative pressure valve seat (8i) respectively provided in the input member (32) and the valve piston (8), an atmospheric valve (31b) removably contacting the atmospheric valve seat (21a) to communicate or isolate the variable pressure chamber (6) with or from an atmosphere, and a negative pressure valve (31a) removably contacting the negative pressure valve seat (8*i*) to communicate or isolate the variable pressure chamber (6) with or from the negative pressure chamber (5);

an output member (14) provided in the valve piston (8) so as to be movable forwards and backwards relative to the valve piston (8) and to push and move the piston (13*a*) with forward movement of the valve piston (8);

reaction applying means (20) for transmitting part of reaction force that is transmitted from the piston (13*a*) to the output member (14) to the input member (32); and stop position shifting means (70) for shifting a stop position of the piston (13*a*), at which the piston (13*a*) is prevented from being moved backwards by the output member (14) when the valve piston (8) is at a non-operating position, such that the stop position of the piston (13*a*) at high temperature is set ahead of the stop position at low temperature, to reduce an area with which the port (48*a*) and the cylinder (12*a*) communicate with each other.

2. The vacuum booster as set forth in claim 1, wherein the stop position shifting means (70) comprises an elastic member (71) that is made of a shape memory alloy and is interposed between the piston (13*a*) and the output member (14) to shift the piston (13*a*) such that a position of the piston (13*a*) relative to the output member (14) at high temperature is set ahead of a corresponding position at low temperature.

3. The vacuum booster as set forth in claim 1, wherein the stop position shifting means (70) comprises length changing means (74) that makes the output member (14) longer at high temperature than at low temperature.

4. The vacuum booster as set forth in claim 3, wherein, in the length changing means (74), the output member (14) is divided into a first output part (14*c*) provided in the valve piston (8) and a second output part (14*d*) contacting the piston (13*a*), and an elastic member (71) made of a shape memory alloy is interposed between the first output part (14*c*) and the second output part (14*d*) to shift the second output part (14*d*) relative to the first output part (14*c*) such that a position of the second output part (14*d*) at high temperature is set ahead of a corresponding position at low temperature.

5. The vacuum booster as set forth in claim 1, wherein the stop position shifting means (70) comprises non-operating position shifting means (76) that shifts the valve piston (8) such that a non-operating position of the valve piston (8) at high temperature is set ahead of a corresponding position at low temperature.

6. The vacuum booster as set forth in claim 5, wherein the stop position shifting means (70) comprises a key member (22) that radially passes through the valve piston (8) and contacts the booster shell (2) to limit backward movement of the valve piston (8) and the input member (32) relative to the booster shell (2), and an elastic member (71) that is made of a shape memory alloy and is interposed between the key member and the booster shell (2), so that a position at which the backward movement of the key member (22) is limited at high temperature is set ahead of a corresponding position at low temperature.

7. The vacuum booster as set forth in claim 1, wherein the stop position shifting means (70) comprises a contact part (14*g*, 72, 73*a*, 75) to limit backward movement of the piston (13*a*), thus setting the stop position of the piston (13*a*) at low temperature.

* * * * *